(12) United States Patent
Gaenzle et al.

(10) Patent No.: US 7,373,952 B2
(45) Date of Patent: May 20, 2008

(54) SANITARY OUTFLOW FITTING

(75) Inventors: Fritz Gaenzle, Stuttgart (DE); Rainer Stark, Neuhausen (DE)

(73) Assignee: Hansa Metallwerke AG, Stuttgart (DE)

( * ) Notice: Subject to any disclaimer, the term of this patent is extended or adjusted under 35 U.S.C. 154(b) by 120 days.

(21) Appl. No.: 10/540,781

(22) PCT Filed: Dec. 24, 2003

(86) PCT No.: PCT/EP03/14914

§ 371 (c)(1),
(2), (4) Date: Feb. 23, 2006

(87) PCT Pub. No.: WO2004/059197

PCT Pub. Date: Jul. 15, 2004

(65) Prior Publication Data
US 2006/0180216 A1 Aug. 17, 2006

(30) Foreign Application Priority Data
Dec. 27, 2002 (DE) ................ 102 61 266

(51) Int. Cl.
*F16K 11/072* (2006.01)
(52) U.S. Cl. ...................... 137/625.4; 4/677
(58) Field of Classification Search .......... 137/625.17, 137/625.4, 625.41; D23/238; 4/677; 239/25
See application file for complete search history.

(56) References Cited

U.S. PATENT DOCUMENTS

| 3,726,316 A | | 4/1973 | Moen | |
| 4,676,270 A | * | 6/1987 | Knapp et al. | 137/625.4 |
| 5,755,258 A | | 5/1998 | Pawelzik et al. | |
| 5,992,457 A | * | 11/1999 | Humpert et al. | 137/625.17 |
| 6,070,611 A | * | 6/2000 | Becker | 137/625.4 |

(Continued)

FOREIGN PATENT DOCUMENTS

DE 27 39 587 A1 3/1979

(Continued)

*Primary Examiner*—John Fox
(74) *Attorney, Agent, or Firm*—Factor & Lake, Ltd.

(57) ABSTRACT

The invention relates to a sanitary outflow fitting, especially a single-lever mixer (1), comprising, in a manner known per se, a housing (2) provided with at least one admission (5, 6) for water, and one outlet (49). A control cartridge (26) is located inside (10) the fitting housing (2), the manually operable control lever (34) of said cartridge controlling the flow of water through the outflow fitting (1). The aim of the invention is to be able to use a conventional control cartridge (26) with the admission and outflow openings thereof located on the lower side, even when the outflow (49) is in the upper or uppermost region of the outflow fitting (1). To this end, the control cartridge (26) is arranged inside a receiving insert (14). Water arriving towards the control cartridge (26) and leaving the same flows through said receiving insert (14). The water leaving the control cartridge reaches a water distribution chamber (12) which is provided between the receiving insert (14) and the bottom of the inner chamber (10) of the fitting housing (2), and guides the water into the radially outer region of the inner chamber of the fitting housing (2), whereupon it can flow towards the outflow (49), via a throughflow chamber (24) located between the envelope surface of the receiving insert (14) and the envelope surface of the inner chamber (10) of the fitting housing (2).

18 Claims, 5 Drawing Sheets

U.S. PATENT DOCUMENTS

| | | | |
|---|---|---|---|
| 6,394,133 B1 * | 5/2002 | Knapp | 137/615 |
| 6,757,921 B2 * | 7/2004 | Esche | 4/677 |
| D513,064 S * | 12/2005 | Zetsche | D23/291 |

FOREIGN PATENT DOCUMENTS

| | | |
|---|---|---|
| DE | 34 26 740 A1 | 1/1986 |
| DE | 27 39 587 C3 | 8/1988 |
| DE | 198 44 627 A1 | 4/2000 |
| EP | 0 221 230 B1 | 1/1990 |
| FR | 2 438 217 A | 4/1980 |
| FR | 2 447 508 A2 | 8/1980 |
| WO | WO 96/29530 A | 9/1996 |
| WO | WO 01/63157 A1 | 8/2001 |

* cited by examiner

SANITARY OUTFLOW FITTING

RELATED APPLICATIONS

This application claims the benefit of PCT Patent Application PCT/EP2003/014914 filed, Dec. 24, 2003; which claims the benefit of German Patent Application DE 10261266.8, filed Dec. 27, 2002—the contents of which are expressly incorporated by reference herein.

The invention relates to a sanitary outlet fitting, in particular a single-lever mixer, having a) a fitting housing with at least one inlet for water;
b) an outlet;
c) a control cartridge, which is accommodated in the inside of the fitting housing, is supplied with the water flowing in via the inlet of the fitting housing and controls the onward flow of this water to the outlet according to the position of a control lever;
d) the control cartridge having at its underside at least one inlet opening and one outlet opening for water.

Sanitary outlet fittings of this type have been known in countless versions for over twenty years and are widely available on the market. In these sanitary outlet fittings, it is preferred to use control cartridges, as described in DE 27 39 587 C3. These control cartridges all have connection openings at the underside of their bottom, thereby facilitating the leaktight connection of the control cartridge to the fitting housing. The water flowing out of the control cartridge is then guided over a certain distance in the bottom of the fitting housing and from there passes to the outlet. This design principle is particularly suitable where the outlet is attached to the fitting housing in a relatively low position, so that communication can easily be established between the throughflow space in the bottom of the fitting housing and the outlet.

Recently, there has been an increasing desire to see new trends introduced in the design of sanitary fittings. In particular, sanitary outlet fittings in which the outlet is situated in the upper or even uppermost region are also desired. This presents difficulties in getting the water, which emerges downwards from the control cartridge, to the outlet. In principle, it would be possible to solve this problem by providing the outlet opening of the control cartridge not in the bottom of the latter but in the upper region. However, on the one hand this gives rise to problems with the leaktight transfer of the water to the corresponding throughflow spaces in the fitting housing and on the other hand special control cartridges are required for these purposes. The desire among sanitary-fitting manufacturers and plumbers, however, is to keep the number of components as small as possible.

The object of the present invention is to design a sanitary outlet fitting of the type mentioned at the beginning in such a way that a flow of water can be provided, with little outlay, also to outlets lying in the upper or uppermost region of the sanitary fitting, while using the conventional control cartridges.

This object is achieved according to the invention in that
e) the control cartridge is arranged in the inside of a receiving insert, which
  ea) has at least one through-bore, which at one end communicates with the at least one inlet of the fitting housing and at the other end communicates with the at least one inlet opening of the control cartridge;
  eb) has a further through-opening, which at its one end communicates with the outlet opening of the control cartridge and at its other end communicates with a water-distributing space, which is provided between the receiving insert and the fitting housing and for its part leads to the radially outer region of the interior of the fitting housing,
f) there being provided between the circumferential surface of the receiving insert and the circumferential surface of the interior of the fitting housing a throughflow space, via which the water can flow upwards to the outlet.

According to the invention, the control cartridge is therefore not installed directly in the interior of the fitting housing but in a separate receiving insert which lies between the fitting housing and the control cartridge as an "adapter" so to speak. The flow paths required to divert the water, emerging downwards from the control cartridge, in the upward direction to the outlet can now be created between this receiving insert and the bottom, as well as the circumferential surface, of the interior of the fitting housing. In the process, the water flows around the receiving insert, at least in certain regions.

It is expedient for there to be provided between the circumferential surface of the receiving insert and the circumferential surface of the interior of the fitting housing a spacer ring, which positions the receiving insert and has recesses through which the water can flow. This construction is employed particularly where the throughflow space between the receiving insert and the circumferential surface of the interior of the fitting housing is to be annular. The spacer ring then holds the receiving insert in the radial direction in such a way that a gap-like throughflow space of constant thickness is obtained around its entire circumferential surface.

In a preferred embodiment of the invention, there is arranged in the through-bore, communicating with the outlet opening of the control cartridge, of the receiving insert a restrictor which limits the quantity of water flowing through per unit time to a maximum value. The effect achieved by this construction is that, when the control cartridge is fully open, the configuration of the stream of water emerging from the outlet does not change any more if variations of the water pressure occur in the domestic piping to which the outlet fitting is connected.

The design, according to the invention, of the sanitary outlet fitting is particularly suitable for the outlet to have the shape of a dish, which is arranged on the upper side of the sanitary outlet fitting. With such a dish-like outlet, not only is a particularly aesthetic effect achieved; the water curtain flowing from this outlet is also found be many users to be particularly comfortable and pleasant.

In this case, it is again expedient for the dish to be inclined in such a way that the water preferably runs off over a limited angular region of its edge. The water curtain is thus given, transversely to the flow direction, the extent which is desired in the individual case.

The dish can have a throughflow opening, through which the water flows from below onto the upper side of the dish. The dish is not therefore fed from one side, but from an internal opening, thereby once again resulting in an aesthetically, particularly attractive stream configuration.

If the sanitary outlet fitting is a single-lever mixer, a particularly suitable embodiment of the invention is one in which an actuating mechanism for the control cartridge extends through the dish, and the operating lever projects upwards out of the dish. This single-lever mixer can therefore be operated fundamentally in a known manner, even though the dish serving as outlet is the uppermost component, apart from the operating lever.

An exemplary embodiment of the invention is explained in more detail below with reference to the drawing, in which FIG. 1 shows an axial section through a washbasin fitting;

Figure 1:
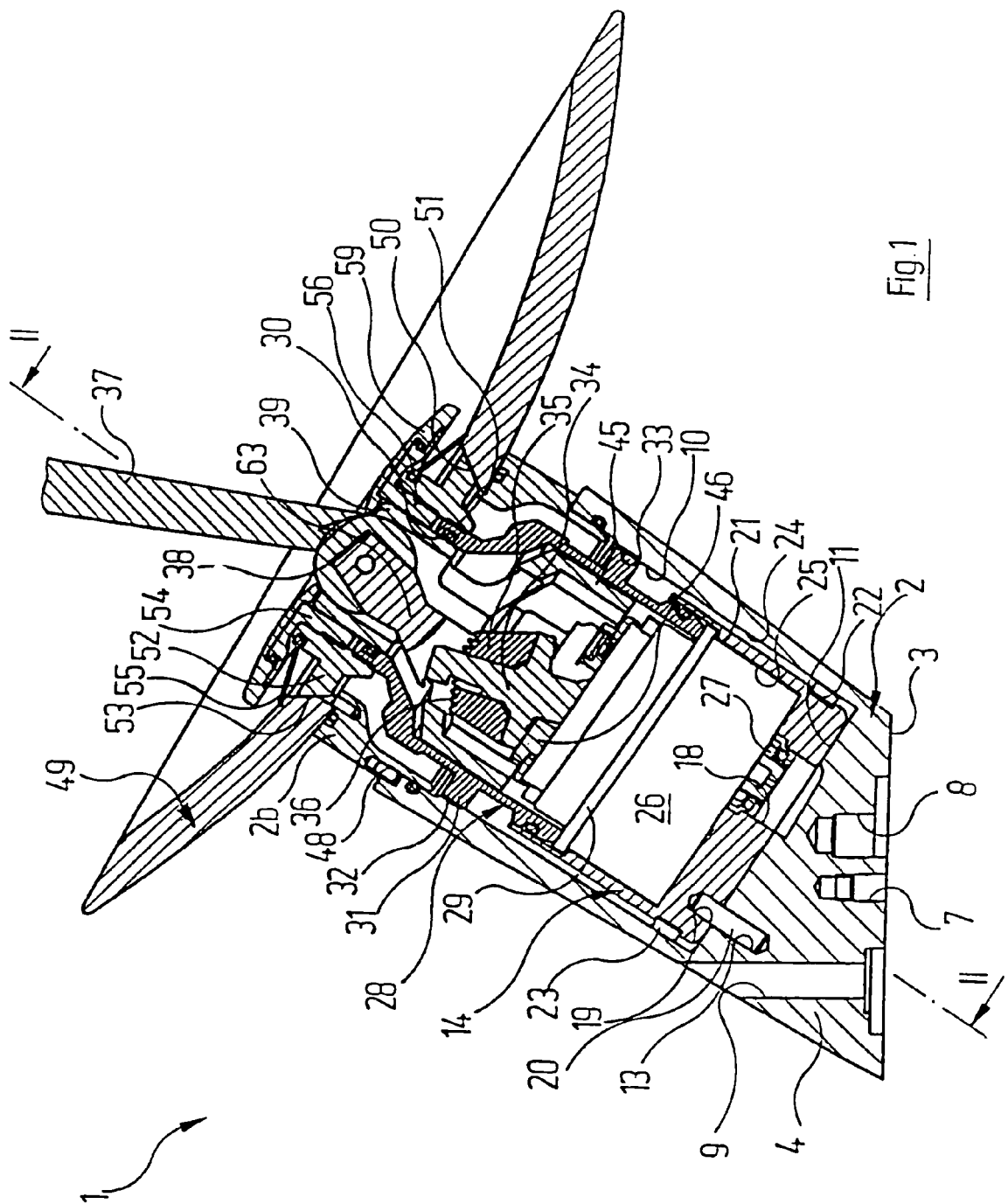

The washbasin fitting illustrated in the drawing, which bears the reference symbol 1 as a whole, comprises a fitting housing 2, consisting of a cup-shaped, upwardly open main part 2a and a spacer ring 2b seated on the latter. The main part 2a is bounded at the bottom by a standing surface 3, which is at an acute angle to the housing axis. In the mounted state, the standing surface 3 bears on a corresponding horizontal washbasin surface, so that the axis of the housing 2, as illustrated, runs at an angle differing from 90° relative to the horizontal.

Figure 2:
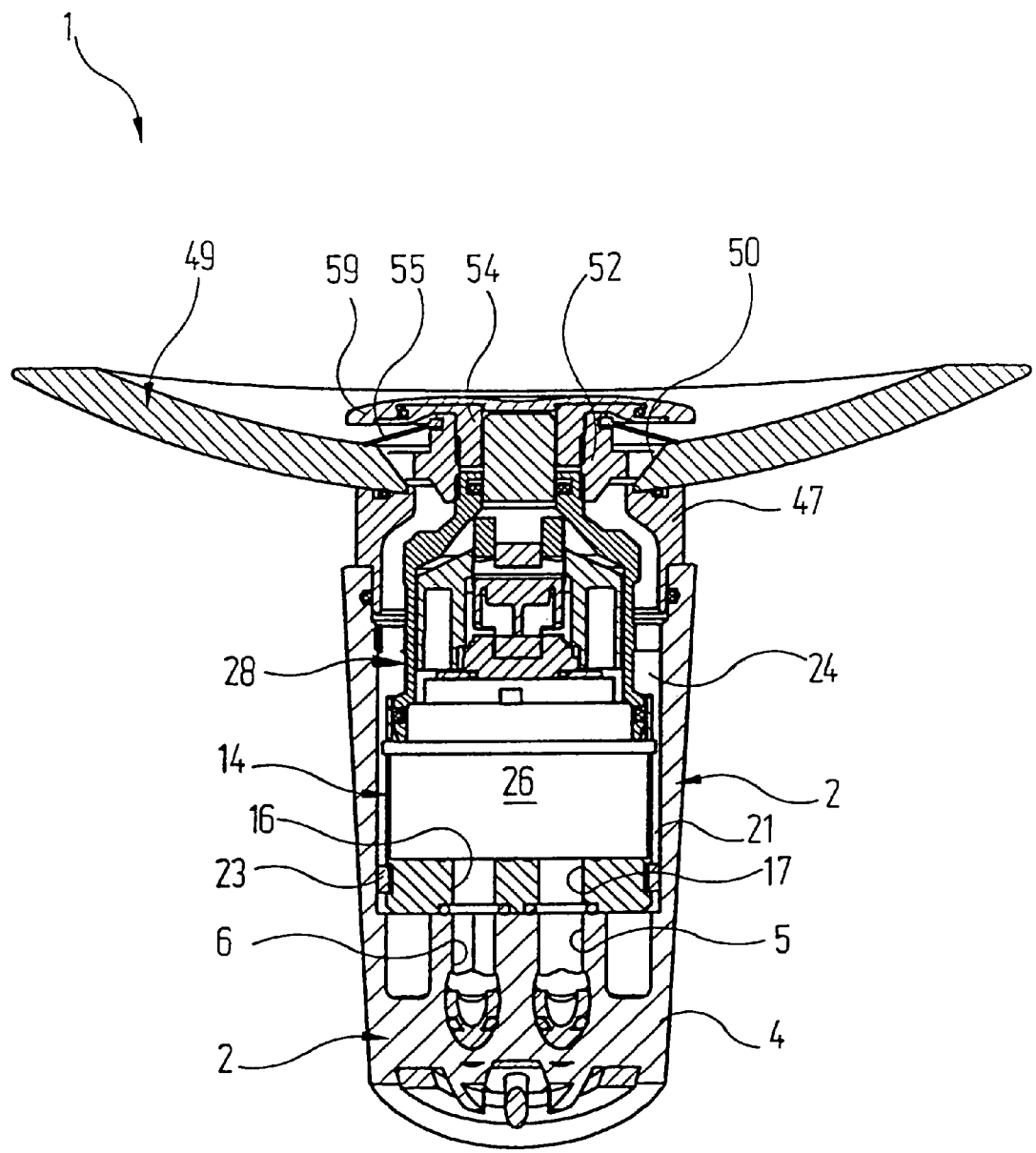
FIG. 2 shows a section through the washbasin fitting of FIG. 1 taken on the line II-II therein.
Figure 3:
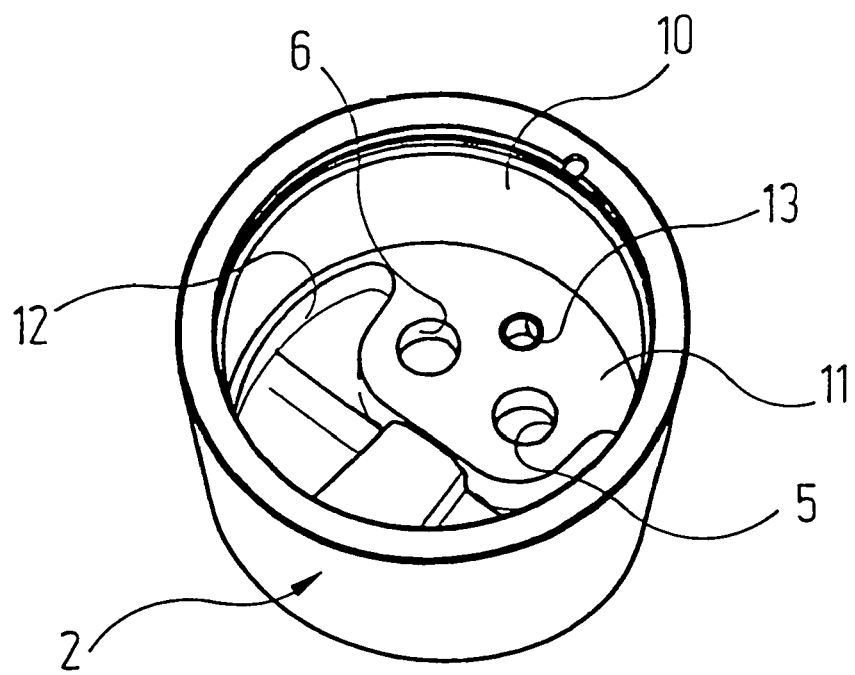
FIG. 3 shows, in perspective, the top view of the main part of the fitting housing of the washbasin fitting of FIGS. 1 and 2.

As can be gathered in particular from FIGS. 2 and 3, the bottom 4 of the housing 2, on which the standing surface 3 is formed, has passing through it two through-bores 5, 6, which are arranged mirror-symmetrically with respect to the section plane of FIG. 1 and in which inlet pipes (not illustrated) for hot and cold water can be fastened. A blind threaded bore 7, made in the bottom 4 of the housing 2 approximately at the centre of the standing surface 3 and vertically with respect to the latter, serves for this fastening. Into a further blind threaded bore 8, made in the bottom 4 parallel to the blind threaded bore 7 from the standing surface 3, can be screwed a fastening rod (not illustrated in the drawing), which serves in customary fashion for fastening the washbasin fitting 1 to the washbasin. Finally, the bottom 4 of the housing 2 has passing through it an eccentric through-bore 9, which at the top, however, does not open out into the interior of the housing 2 but on the outer circumferential surface of the housing 2. This through-bore serves for guiding through an actuating rod (not illustrated) for the drain valve of the washbasin on which the washbasin fitting 1 is mounted.

FIG. 3 shows a view into the interior of the main part 2a of the housing 2, seen from above. The openings of the water-guiding through-bores 5, 6 can be seen in this figure. An approximately C-shaped indentation 12 is made in the bottom surface 11, which indentation covers the entire half of this bottom surface 11 opposite the through-bores 5 and 6, as well as two regions reaching into the half of the through-bores 5, 6 and partly surrounding them. In the plane of symmetry, a single blind bore 13 is additionally made in the bottom surface 11, the purpose of which bore will become clear hereinbelow.

Figure 4:
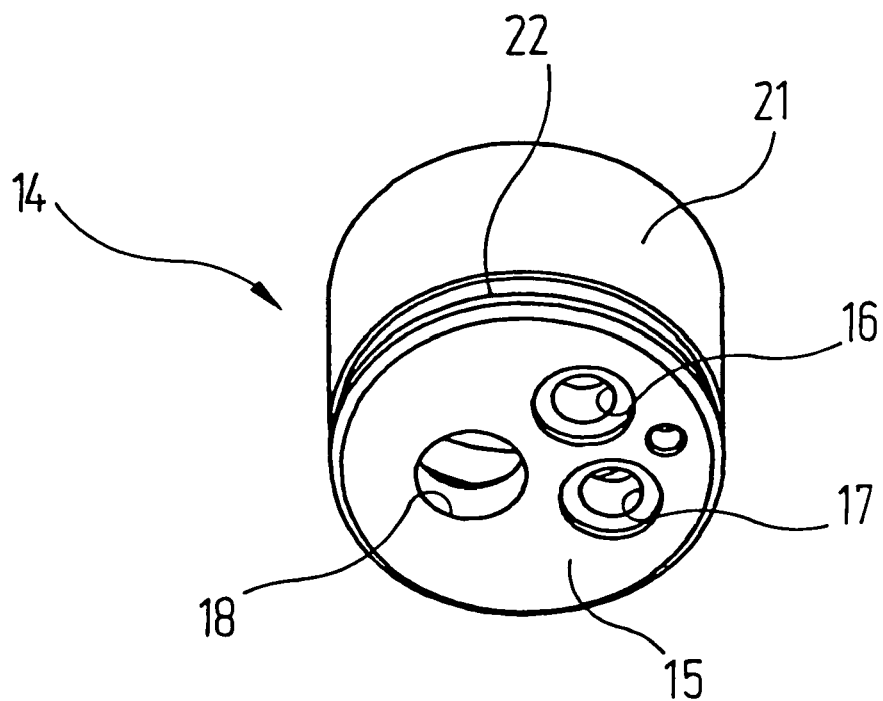
FIG. 4 shows, in perspective, the bottom view of a receiving insert of the washbasin fitting of FIGS. 1 and 2.
Figure 5:
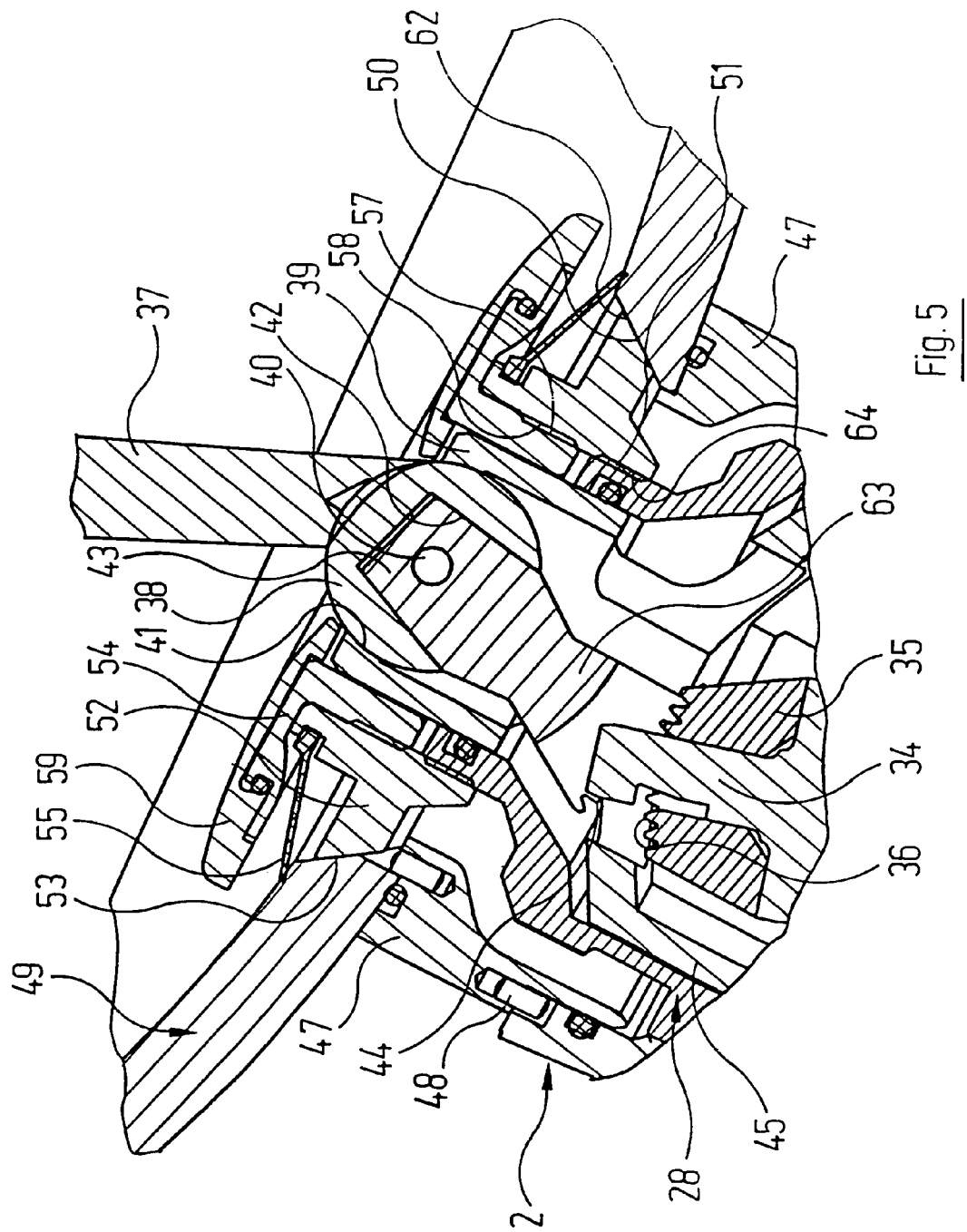
FIG. 5 shows a detail enlargement from FIG. 1.

A receiving insert 14, likewise having the shape of an upwardly open cup, is placed in the interior 10 of the main part 2a of the housing 2 from above. The bottom 15 of the receiving insert 14 has passing through it two symmetrical, eccentrically located through-bores 16, 17, which in the mounted state are in alignment with the through-bores 5 and 6 in the housing 2. These through-bores 16, 17 can be seen in FIGS. 2 and 4. The purpose of a further, large-area through-bore 18, which is provided opposite the two through-bores 16, 17 in the plane of symmetry of the receiving insert 14, will likewise only become clear hereinbelow. Finally, a blind bore 19, which in the mounted state is in alignment with the blind bore 13 in the bottom 4 of the housing 2, is made in the bottom 15 of the receiving insert 14 from below. A pin 20 inserted into the two blind bores 13, 19 ensures the correct orientation of the receiving insert 14 relative to the bottom 4 of the housing 2.

An annular groove 22, in which a spacer ring 23 is located, is formed in the circumferential surface 21 of the receiving insert 14 in the lower region adjacent to the bottom surface 15. As FIG. 1 shows, the spacer ring 23 has an outside diameter corresponding to the diameter of the interior 10 of the main part 2a of the housing 2. The spacer ring 23 therefore centres the receiving insert 14 inside the housing 2 in such a way that an annular throughflow space 24 remains between the circumferential surface of the interior 10 and the circumferential surface 21 of the receiving insert 14. The spacer ring 23 has on its outer circumferential surface a multiplicity of axially parallel grooves or notches, through which water can flow. These are not visible in the drawing.

A control cartridge, known per se and bearing the reference symbol 26 as a whole, is inserted from above into the interior 25 of the receiving insert 14. The control cartridge 26 contains control discs, generally made of ceramic, of which one is fixed and the other is movable relative to the one that is fixed. By a combined rotary and/or translatory movement of the movable control disc, the throughflow of the hot and cold water through the control cartridge 26 can be controlled in such a way that the water emerging from it can be set in terms of its temperature and quantity. In its bottom, the control cartridge 26 has two through-bores which are in alignment with the through-bores 16 and 17 of the receiving insert 14 and serve for supplying hot and cold water, respectively, to the control cartridge 26, as well as a further through-bore via which the mixed water emerges from the control cartridge 26 again. This through-bore of the control cartridge 26 is in alignment, in the mounted state, with the through-bore 18 in the receiving insert 14, which through-bore 18 for its part is oriented in such a way that the mixed water flowing through it passes into the indentation 12 of the housing 2.

In the process, the mixed water flows through a quantity restrictor 27, which is fastened in the through-bore 18 of the receiving insert 14. The quantity restrictor 27 is designed in such a way that it limits the flow quantity per unit time to a maximum value which cannot be exceeded any more, even in the event of a pressure rise.

The control cartridge 26 is held in the interior 25 of the receiving insert 14 by a screw part 28, which with its lower region projects from above into the interior 25 of the receiving insert 14, is sealed off there with respect to the circumferential surface of the interior 25 and with its lower edge bears against a circumferential flange 29 of the control cartridge 26. The screw part 28 is roughly in the shape of a bell which is provided with a large-area through-bore 30 at its upper end. Situated on an annular collar 31, which is at a certain distance from the lower edge pressing on the flange 29 of the control cartridge 26, is an external thread 32 which cooperates with a thread 33 in the upper end region of the circumferential surface of the interior 10 of the main part 2a of the housing 2. The arrangement is such that, when the external thread 32 of the screw part 28 is screwed into the thread 33 of the housing 2, the screw part 28 pushes the control cartridge 26 downwards so that it bears against the bottom surface of the interior 25 of the receiving insert 14 and in the process compresses seals provided there, which ensure a leaktight transfer of the streams of water between the bores 16, 17, 18 of the receiving insert 14 and the bores, in alignment therewith, in the bottom of the control cartridge 26.

The control lever 34 of the control cartridge 26 projects from below into the interior space surrounded by the bell-shaped screw part 28. The control lever can be pivoted in a known manner about an axis running perpendicular to the axis of the control cartridge 26, in order to change the quantity of mixed water flowing out of the control cartridge 26, and rotated about an axis running parallel to the axis of the control cartridge 26, in order to adjust the mixing proportion of cold and hot water and hence the temperature of the mixed water flowing out.

When employed in conventional sanitary fittings, their operating lever is positively seated directly on the control lever 34. In the present case, by contrast, a driving part 35, which bears toothing 36 at its upper, circular-arc-shaped edge, is fastened to the control lever 34.

The operating lever 37, on which the user's hand acts, projects substantially upwards in the washbasin fitting illustrated. At its lower, facing end, it has a spherical bearing part 38, which is rotatably mounted in a bearing ring 39 by means of a pivot pin 40. The spherical part 38 in this arrangement bears with its outer surface slidingly on a complementary spherical-cap-shaped bearing surface 41 of the bearing ring 39. The bearing ring 39 for its part is rotatable about an axis coaxial with the axis of the housing 2.

In a recess 42 of the bearing part 38 there is accommodated an end region of a pivoting member 63, which bears circular-arc-shaped toothing 44 at the lower edge of its region projecting from the bearing part 38. The toothing 44 meshes with the toothing 36 on the driving part 35 connected to the control lever 34 of the cartridge 26.

The bearing ring 41 widens from the upper, cylindrical region, in which the operating handle 37 is mounted, downwards into a hollow-cylindrical apron 45, which at its inner circumferential surface positively engages with a rotating part 46 of the control cartridge 26. The region of this rotating part 46 which protrudes upwards from the housing of the control cartridge 26 can be seen in FIGS. 1 and 2. In the internal region, this rotating part 46, in which the control lever 34 is also pivotably mounted and which is rotatable about the axis of the control cartridge 26, is in rotationally locked connection with the movable control disc of the control cartridge 26.

The intermediate ring 47 is placed on the upper edge of the main part 2a of the housing 2, a pin 48, located in blind bores of the main part 2a and of the intermediate ring 47, once again ensuring the correct rotary orientation. Placed on the upper end face of the intermediate ring 47 is, in turn, a relatively large outlet dish 49, which is convex when seen from above. The outlet dish 49 has passing through it a circular opening 50, which widens conically in the outer region.

The screw part 28 has at its end facing away from the control cartridge 26 an external thread 51, onto which a fastening ring 52 with an internal thread 64 is screwed. The fastening ring 52 has a circumferential surface 53 which is inclined in a manner complementary to the conical wall of the through-bore 50 of the outlet dish 49. The fastening ring 52 thus pushes the outlet dish 49 against the upper end face of the intermediate ring 47. The circumferential surface 53 of the fastening ring 52 is provided with a multiplicity of groove-like openings, which together form an annular, albeit interrupted, throughflow opening 62.

Between the upper edge region of the fastening ring 52 and a clamping ring 54 is clamped the inner edge of an annular membrane 55. For this purpose, the clamping ring 54 has a hollow-cylindrical hub 56 extending in the axial direction and bearing an external thread 57. The latter is screwed to an internal thread 58 of the fastening ring.

Finally, a flat, annular cover 59 is clipped over the upper end face of the clamping ring 54.

Figure 6:
FIG. 6 shows a section through a membrane used in the washbasin fitting of FIGS. 1 and 2.

The membrane 55 is depicted separately in FIG. 6. It comprises a relatively thin, flexible region 60 which in the installed position widens conically towards the outlet dish 49 and starts from a clamping bead 61 situated at the radially inner edge. When the control cartridge 26 is closed, as illustrated in FIGS. 1 and 2, the radially outer edge of the membrane 55 bears on the upper surface of the outlet dish 49.

The above-described washbasin fitting 1 operates as follows:

First of all, it is assumed that the movable control disc inside the control cartridge 26 is in its closed position, in which the throughflow of both cold and hot water is therefore prevented. The cold and hot water are standing in the aligned through-bores 5, 6 of the housing 2, the through-bores 16 and 17 of the receiving insert 14 and the through-bores (not illustrated) in the bottom of the control cartridge 26 and pressing on the underside of the movable control disc.

If a flow of water is now to be initiated, the user pivots the operating lever 37 upwards, anticlockwise in the view of FIG. 1. This results in the pivoting member 63, connected to the operating lever 37 via the spherical bearing part 38, likewise pivoting anticlockwise. This movement is transmitted to the control lever 35 of the control cartridge 26 via the mutually engaged toothings 44 and 36. The control lever 35 pivots downwards, clockwise in the view of FIG. 1, and, with its lower end situated in the inside of the housing of the control cartridge 26, displaces the movable control disc in such a way that water starts flowing through the control cartridge 26. The mixing proportion of cold and hot water contained in the mixed water emerging from the control cartridge 26 is determined by the rotary position of the rotating part 46 of the control cartridge 26, which for its part can, in turn, be adjusted by rotation of the bearing ring 39 about the axis of the bearing ring. This rotation of the bearing ring 39 is also brought about by way of the operating lever 37, which is therefore to be actuated fundamentally in the same way as is the case with conventional single-lever mixers.

Figure 7:
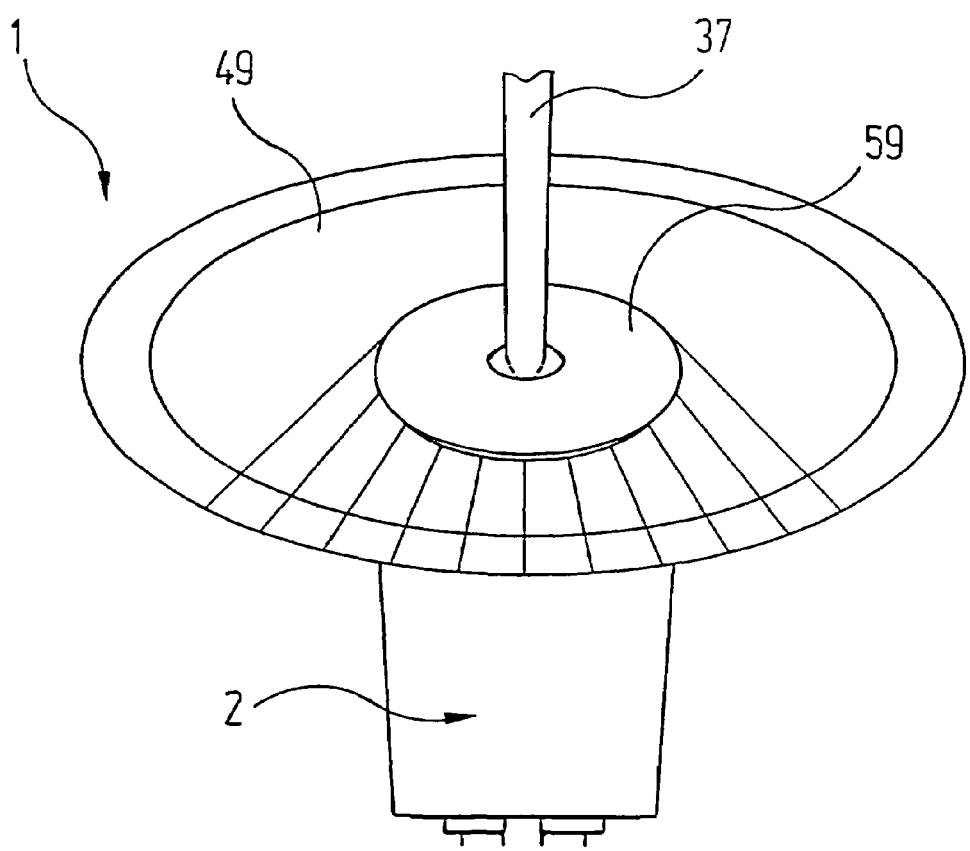
FIG. 7 shows, diagrammatically, the water-stream configuration obtained with the washbasin fitting of FIGS. 1 and 2.

The mixed water leaving the control cartridge 26 flows firstly through the quantity restrictor 27, which ensures that only a given maximum quantity of water per unit time can flow through. The mixed water flows from the quantity restrictor 27 on through the through-bore 18 in the bottom 15 of the receiving insert 14, from there into the indentation in the bottom 11 of the housing 2 and spreads out in the circumferential direction in the latter. From the indentation 12, the water flows on, via the annular flow space 24 between the inner circumferential surface of the housing 2 and the outer circumferential surface 21 of the receiving insert 14, through recesses in the annular collar 31 of the screw part 28 up to the fastening ring 52. It then passes through the groove-like recesses at the circumferential surface 53 of the fastening ring 52 along the gap between fastening ring 52 and through-bore 50 of the outlet dish 49 and thus arrives in the space beneath the membrane 55. The membrane 55 is now lifted upwards by the water pressure, so that the water can emerge onto the upper surface of the outlet dish 49. From there, it flows off over a large area in a stream configuration as illustrated diagrammatically in FIG. 7, and drops downwards from the lower edge region of the outlet dish 49 in the manner of a curtain. The quantity restrictor 27 in the through-bore 18 of the receiving insert 14 ensures that pressure fluctuations in the domestic piping cannot change the stream configuration any more once the maximum output in litres, preset by the quantity restrictor 27, of the washbasin fitting 1 is reached.

When the flow of water through the control cartridge 26 is turned off again by pivoting the operating lever 37 in the opposite direction, the outer edge of the membrane 55 is returned by the elastic forces of the membrane 55 to the position illustrated in FIGS. 1 and 2 again, in which it bears on the upper surface of the outlet dish 49. In this position, the membrane 55 prevents water, in particular dirty water, from penetrating from above into the inside of the washbasin fitting 1.

The invention claimed is:

1. Sanitary outlet fitting having
    a) a fitting housing with at least one inlet for water;
    b) an outlet;
    c) a control cartridge, which is accommodated in the inside of the fitting housing, is supplied with the water flowing in via the inlet of the fitting housing and controls the onward flow of this water to the outlet according to the position of a control lever;
    d) the control cartridge having at its underside at least one inlet opening and one outlet opening for water, wherein the control cartridge is arranged in the inside of a receiving insert, which
        ea) has at least one through-bore, which at one end communicates with the at least one inlet of the fitting housing and at the other end communicates with the at least one inlet opening of the control cartridge;
        eb) has a further through-opening, which at its one end communicates with the outlet opening of the control cartridge and at its other end communicates with a water-distributing space, which is provided between the receiving insert and the fitting housing and for its part leads to the radially outer region of the interior of the fitting housing;
    f) there being provided between the circumferential surface of the receiving insert and the circumferential surface of the interior of the fitting housing a through-flow space, via which the water can flow upwards to the outlet, and a spacer ring that positions the receiving insert and has recesses through which the water can flow.

2. Sanitary outlet fitting according to claim 1, wherein it is designed as a single-lever mixer.

3. Sanitary outlet fitting according to claim 2 wherein there is provided between the circumferential surface of the receiving insert and the circumferential surface of the interior of the fitting housing a spacer ring, which positions the receiving insert and has recesses through which the water can flow.

4. Sanitary outlet fitting according to claim 3 wherein there is arranged in the through-bore, communicating with the outlet opening of the control cartridge, of the receiving insert a restrictor which limits the quantity of water flowing through per unit time to a maximum value.

5. Sanitary outlet fitting according to claim 4, wherein the outlet has the shape of a dish, which is arranged on the upper side of the sanitary outlet fitting.

6. Sanitary outlet fitting according to claim 5, wherein the dish is inclined in such a way that the water preferably runs off over a limited angular region of its edge.

7. Sanitary outlet fitting according to claim 5 wherein the dish has a throughflow opening, through which the water flows from below onto the upper side of the dish.

8. Sanitary outlet fitting according to claim 7, wherein an actuating mechanism for the control cartridge extends through the dish, and the operating lever projects upwards out of the dish.

9. Sanitary outlet fitting according to claim 2 wherein there is arranged in the through-bore, communicating with the outlet opening of the control cartridge, of the receiving insert a restrictor which limits the quantity of water flowing through per unit time to a maximum value.

10. Sanitary outlet fitting according to claim 9, wherein the outlet has the shape of a dish, which is arranged on the upper side of the sanitary outlet fitting.

11. Sanitary outlet fitting according to claim 10, wherein the dish is inclined in such a way that the water preferably runs off over a limited angular region of its edge.

12. Sanitary outlet fitting according to claim 10 wherein the dish has a throughflow opening, through which the water flows from below onto the upper side of the dish.

13. Sanitary outlet fitting according to claim 12, wherein an actuating mechanism for the control cartridge extends through the dish, and the operating lever projects upwards out of the dish.

14. Sanitary outlet fitting according to claim 1 wherein there is arranged in the through-bore, communicating with the outlet opening of the control cartridge, of the receiving insert a restrictor which limits the quantity of water flowing through per unit time to a maximum value.

15. Sanitary outlet fitting according to claim 1, wherein the outlet has the shape of a dish, which is arranged on the upper side of the sanitary outlet fitting.

16. Sanitary outlet fitting according to claim 15, wherein the dish is inclined in such a way that the water preferably runs off over a limited angular region of its edge.

17. Sanitary outlet fitting according to claim 15 wherein the dish has a throughflow opening, through which the water flows from below onto the upper side of the dish.

18. Sanitary outlet fitting according to claim 17, wherein an actuating mechanism for the control cartridge extends through the dish, and the operating lever projects upwards out of the dish.

* * * * *